3,236,907
PRODUCTION OF CONJUGATED DIOLEFINES
Max Marin Wirth and John Habeshaw, Dollar, Scotland, assignors to British Hydrocarbon Chemicals Limited, London, England, a British company
No Drawing. Filed Feb. 20, 1962, Ser. No. 174,414
Claims priority, application Great Britain, Feb. 27, 1961, 7,184/61 and 7,185/61
10 Claims. (Cl. 260—681)

The present invention relates to the production of conjugated diolefines.

The production of conjugated diolefines from 1,3-dioxanes, which are substituted at least once in the 4-position with an alkyl radical, by contacting the dioxane at an elevated temperature in the vapour phase with a catalyst, is known, and in our British Patent No. 873,875 is described such a process using as catalyst boron phosphate deposited on a support, such as silica gel.

A catalyst of this type is usually prepared by impregnating the support with one or more solutions containing the desired catalytic components, drying the impregnated support, and heating it if necessary to convert the catalyst into the desired state. Thus a boron phosphate/silica gel catalyst may be prepared by impregnating silica gel with mixed aqueous solutions of boric acid and phosphoric acid and drying the resulting mixture.

According to the present invention the process for the production of a conjugated diolefine comprises contacting a 1,3-dioxane as hereinafter defined at an elevated temperature in the vapour phase in the presence of steam with a carrier material on to which the components of boron phosphate are transported in an aqueous vapour stream from solid boron phosphate.

In this process the catalysts show improved resistance to prolonged operation and to high temperature regeneration. In particular, there is much less tendency for the reaction selectivity of the catalyst to decline in use after a number of regenerations as is the case with impregnated catalysts, and especially there is little or no tendency for the proportion of isobutene to isoprene formed to increase with catalyst use when cracking 4,4-dimethyl-1,3-dioxane.

The carrier material may be any high-surface area inert solid, such as silica gel, diatomaceous earths (e.g. Celite), alumina, silica/alumina, fuller's earths and the like. It is preferred to use silica gel, or a diatomaceous earth such as Celite.

In the process of the invention the boron phosphate may be situated in a bed separate from the bed of carrier material, or alternatively a single bed of particulate boron phosphate intimately mixed with particles of the carrier material may be used. The boron phosphate may, if desired, be submitted to a prior heat treatment, for instance between 300° and 1000° C. before being used in the process. This gives a better performance and tends to reduce carbon deposition.

In the case where separate beds of boron phosphate and carrier material are used, the process is suitably carried out by passing the preheated gaseous reaction mixture containing steam first over a bed of boron phosphate and then over the carrier material, both beds being maintained at an elevated temperature. In this case only a small amount of reaction takes place over the boron phosphate bed. Alternatively only the steam either with or without an inert gas can be passed over the boron phosphate bed. In the latter case the resulting gaseous mixture containing the catalytic components may either be combined with a stream of 1,3-dioxane vapour and the mixed streams passed over the carrier material, or may be passed as such over the carrier material alternatively to a stream of 1,3-dioxane and steam.

The solid boron phosphate bed may be positioned separately from the carrier material in such a way that the temperature and flow rates through the boron phosphate may be regulated independently of the dioxane cleavage reaction conditions so enabling the amount of catalytic components transported on to the carrier material to be controlled at an optimum value. The amount of boron phosphate transported on to the carrier material may vary within wide limits and is suitably between 0.1 and 1.0 part by weight for every 1200 parts of dioxane fed; it is preferred to use between 0.25 and 0.5 part of boron phosphate per 1200 parts of dioxane fed. The amount of boron phosphate transported increases with the temperature of the boron phosphate bed and with the partial pressure of the steam in the carrying gas. It is preferred to maintain the temperature of the boron phosphate bed in the range 350° to 450° C., and this temperature range is particularly suitable in combination with carrier material temperatures, i.e. reaction temperatures, in the range 300° to 400° C.

The carrier material may be regenerated periodically by heating in a stream of air at an elevated temperature, e.g. between 400° and 500° C. When using a fresh or regenerated batch of carrier material it may be desirable to pass steam either with or without an inert gas over the boron phosphate and carrier material beds in order to transport some catalytic components on to the carrier material before commencing the 1,3-dioxane feed. Alternatively the carrier material may be impregnated with boron phosphate in the conventional way to maintain reaction efficiency in the start-up period.

In another embodiment of the invention, the dioxane is contacted at an elevated temperature in the vapour phase and in the presence of steam with a catalyst made by mixing solid particulate boron phosphate with a carrier material. Such a catalyst may be prepared for instance by mixing powdered boron phosphate with a particulate carrier material, such as silica gel. Alternatively the boron phosphate particles may be suspended in a liquid phase, the liquid phase then being converted into a gel, giving a suspension of boron phosphate particles within the gel. This may be carried out, for instance, by suspending boron phosphate powder in a solution of aqueous hydrochloric acid, and adding with rapid stirring to the suspension an aqueous solution of sodium silicate. The proportion of boron phosphate admixed with the carrier material may vary within moderately wide limits and proportions of boron phosphate of more than about 5% by volume based on the carrier material are suitable.

At the reaction temperatures employed and in the presence of steam the boron phosphate at least partially dissociates into active components which are transported to the surface of the particles of the carrier material.

The starting materials for the process of the present invention are 1,3-dioxanes of the formula

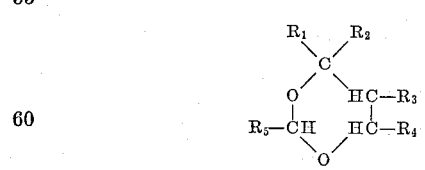

wherein $R_1$ is an alkyl radical and $R_2$, $R_3$, $R_4$ and $R_5$ are hydrogen, alkyl, or aryl radicals. The use of 4,4-dimethyl-1,3-dioxane is preferred. The 1,3-dioxane starting material may be prepared by reacting an olefine hydrocarbon with an aldehyde in the presence of for example an aqueous sulphuric acid catalyst. Thus, 4,4-dimethyl-1,3-dioxane may be produced by the reaction of isobutene with formaldehyde in the presence of such a catalyst. In the case of 1,3-dioxanes prepared by reacting an olefine with an aldehyde the radicals $R_4$ and $R_5$ will be identical.

The reaction may be carried out over a wide range of temperatures, for instance between 200° and 450° C., and preferably between 300° and 400° C. The decomposition of the dioxane is an endothermic reaction and the required heat of reaction may be provided as the sensible heat of the steam or other diluent or of a recirculated reheated portion of the reaction mixture, or as the sensible heat of a superheated moving carrier material, or by using a multitubular reactor with the carrier material packed in externally heated narrow-bore tubes.

The space velocity of the reactant over the carrier material may likewise vary, and is suitably between about 0.1 and 100 liquid volumes of 1,3-dioxane per volume of carrier material per hour. The optimum velocity will vary depending on the reaction temperature, and the particular carrier material in use. It is preferably adjusted so that the conversion of the dioxane is substantially complete. The reaction may be carried out at atmospheric pressure, or increased or reduced pressures may be used, but pressures below about 2 atmospheres are preferred.

The 1,3-dioxane is brought into contact with the carrier material in admixture with steam; if desired mixtures of steam with other unreactive diluents such as nitrogen or butane, may be used.

The diolefines can be recovered from the gaseous reaction product in any suitable manner, for instance by condensing the product followed by fractional distillation of the hydrocarbon portion of the resulting liquid mixture. During the decomposition equimolar amounts of the original aldehyde are formed in producing the diolefine, together with smaller amounts of the original olefine from which the dioxane was made and these may be recovered and re-used in the formation.

A variety of conjugated diolefines can be produced by the process of the invention, including isoprene from 4,4-dimethyl-1,3-dioxane.

The diolefines made in accordance with this invention are valuable chemical intermediates, for instance in the preparation of synthetic rubbers.

The process of the invention is further illustrated with reference to the following examples.

EXAMPLE 1

A bed of a commercial silica gel having a surface area of approximately 300 m.²/g., pore vol. 1.04 cc./g., sodium content 0.04% w./w., and sulphate content 0.02% w./w. was placed in a reactor and a bed of boron phosphate granules previously heated in air at 900° C. for 2 hours and steamed at 400° C., was added on the upstream side of the silica gel bed. The volume of the boron phosphate bed was 0.3 time that of the volume of the silica gel bed. Steam and 4,4-dimethyl dioxane vapour were mixed to give a dioxane partial pressure of 100 mm. and the combined feed was passed through the reactor at a rate of 250 moles/litre of silica gel/hour at a temperature of 350° C. The products obtained over the period 0.5 to 4.0 hours on stream were collected and analysed. The catalyst was then heat treated with air and inert gas at temperatures up to 500° C. to burn off carbon and the reaction cycle repeated. The following results shown in Table 1 were obtained in a series of such reaction and regeneration cycles.

*Table 1*

| Run No. | Dioxane Conversion, percent | Moles Isoprene formed per 100 moles dioxane converted | Isobutene produced (g./100 g. isoprene) | Formaldehyde produced (g./100 g. isoprene) |
|---|---|---|---|---|
| 1 | 96 | 48 | 60 | 114.3 |
| 2 | 94.5 | 64.5 | 31 | 80 |
| 3 | 96.5 | 69.5 | 26.3 | 73.0 |
| 4 | 99.0 | 67.8 | 24.8 | 73.0 |
| 5 | 97 | 61.0 | 27.5 | 79.5 |

The series was repeated using fresh silica gel and boron phosphate except that steam was passed over the boron phosphate and silica gel prior to reaction for 16 hours at 350° C. This eliminated the initial period of low isoprene formation efficiency and high isobutene production evident in Run 1 of Table 1 giving results similar to those of the above Runs 2 to 5. Table 2 illustrates this.

*Table 2*

| Run No. | Dioxane Conversion, percent | Moles Isoprene formed per 100 moles dioxane converted | Isobutene produced (g./100 g. isoprene) | Formaldehyde produced (g./100 g. isoprene) |
|---|---|---|---|---|
| 1 | 99 | 64.5 | 29.8 | 75.5 |
| 2 | 99 | 62.5 | 27.2 | 77.5 |
| 3 | 98 | 64.0 | 27.8 | 76 |

EXAMPLE 2

This example illustrates operation of the process with steam and reactants both passed over the boron phosphate charge.

Boron phosphate was charged to a separate vessel, and the carrier (silica gel of surface area approx. 300 sq. metres per gm.) to the actual reactor. The boron phosphate vessel was maintained at a temperature of 375° C., and the reactor at 350° C. Steam was passed through the boron phosphate and silica beds at a rate of 4 volumes liquid water per volume of carrier per hour for 16 hours before starting reaction. A mixture of 4,4-dimethyl-1,3-dioxane and water was then passed first over the boron phosphate and then over the carrier at a rate of 250 moles/litre carrier/hour for 4 hours, the partial pressure of the dioxane being 100 mm., and the remainder water with a total pressure of 760 mm. After each 4 hour reaction cycle the silica carrier was regenerated by burning off carbon in an air stream, the temperature being kept below 500° C. during this operation. The results obtained in a series of processes are shown in Table 3.

*Table 3*

| Run No. | Dioxane Converted, percent | Moles Isoprene formed per 100 moles dioxane converted | Isobutene formed gms./100 gms. isoprene | Formaldehyde formed gms./100 gms. isoprene |
|---|---|---|---|---|
| 1 | 98 | 64.3 | 35.9 | 80.8 |
| 2 | 98 | 63.3 | 28.1 | 80.0 |
| 3 | 97 | 67.2 | 23.6 | 74.3 |
| 4 | 98 | 66.6 | 28.7 | 76.7 |
| 5 | 100 | 61 | 22.8 | 80.0 |
| 6 | 100 | 66.5 | 27.6 | 75.3 |
| 7 | 100 | 63 | 32.2 | 76.4 |

EXAMPLE 3

In this example boron phosphate was again charged to a separate vessel, and the same silica gel carrier as in Example 2 charged to the reactor. Steam was passed through the boron phosphate and over the carrier for 16 hours at a temperature of 350° C. and a rate of 4 volumes liquid water/volume carrier/hour before starting reaction. The temperature of the boron phosphate was raised to 400° C., and the water feed passed through this charge, joining the 4,4-dimethyl-1,3-dioxane feed before passing over the carrier, which was maintained at a temperature of 350° C. The total feed rate was 250 moles/litre carrier/hour, the dioxane partial pressure being 100 mm. and water partial pressure 660 mm. Each reaction cycle was continued for 4 hours under these conditions. After this cycle, the dioxane feed was stopped, and the carrier purged, and then regenerated in an air stream keeping the temperature below 500° C. Reaction was resumed after carbon burn-off was complete, there being no need to repeat the initial steaming operation. Results of a number of reaction cycles are shown in Table 4.

Table 4

| Run No. | Dioxane Converted, percent | Moles Isoprene formed per 100 moles dioxane converted | Isobutene formed gms./100 gms. isoprene | Formaldehyde formed gms./100 gms. isoprene |
| --- | --- | --- | --- | --- |
| 1 | 99 | 62.5 | 32.3 | 87 |
| 2 | 100 | 65.6 | 23.1 | 79 |
| 3 | 100 | 65.5 | 26.8 | 77.5 |
| 4 | 100 | 67.1 | 24.3 | 76.4 |
| 5 | 100 | 68.6 | 21.0 | 73.9 |

EXAMPLE 4

A series of processes was carried out as in Example 3, except that the water feed was not passed over the boron phosphate during the reaction cycle. That is there was no transport of boron phosphate to the carrier after the initial steaming period. Results were as follows:

Table 5

| Run No. | Dioxane Converted, percent | Moles Isoprene formed per 100 moles dioxane converted | Isobutene formed gms./100 gms. isoprene | Formaldehyde formed gms./100 gms. isoprene |
| --- | --- | --- | --- | --- |
| 1 | 82.8 | 49.3 | 68.1 | 119 |
| 2 | 84.9 | 47.4 | 45.4 | 117 |

Although operable, this method showed a lower conversion and a higher make of isobutene relative to isoprene than when boron phosphate was continuously fed to the carrier, and continuous feeding to the carrier is therefore preferred. Quite good results can, however, be obtained with this intermittent feeding of boron phosphate if the amount of boron phosphate initially placed on the carrier (either by transporting with steam before starting reaction as in this example, or by initial impregnation) is high (i.e. in the region of 10–20 percent by weight).

EXAMPLE 5

A further advantage of this catalyst system is that it can be successfully operated with impure feed. This is shown by this example. Here the 4,4-dimethyl-1,3-dioxane feed was prepared by condensation of isobutene (in a cracked $C_4$ fraction) and formaldehyde with sulphuric acid as catalyst, and after separating from acid and formaldehyde, the organic product was fractionated to take overhead the unreacted $C_4$ hydrocarbons, leaving the crude dioxane product (containing tertiary butanol and high boiling by-products as major impurities) as residue. This crude dioxane was used as feedstock. Two different crude dioxane products were used, results compared with those for pure dioxane under the same conditions being as follows. Conditions were as in Example 2, except that both the carrier and the boron phosphate were maintained at 350° C. during the reaction cycle.

Table 6

| Run No. | Wt. percent Dioxane in Crude Feed | Dioxane Conversion, Percent | Moles Isoprene Formed per 100 Moles Dioxane Converted | Isobutene formed, gms./100 gms. Isoprene | Formaldehyde formed, gms./100 gms. Isoprene |
| --- | --- | --- | --- | --- | --- |
| 1 | 80.3 | 100 | 67.7 | 46.1 | 78.1 |
| 2 | 86.9 | 96 | 72.6 | 31.2 | 76.8 |
| 3 | 86.9 | 97 | 69.6 | 27.7 | 79.3 |
| 4 | 100 | 97.5 | 71.6 | 24.7 | 71.6 |

The crude dioxanes showed an increased formation of isobutene largely because of their tert.butanol content, and higher yields of formaldehyde largely derived from their high boiling by-product content. This increased yield of formaldehyde, which can be recycled to the dioxane synthesis, is an appreciable advantage in the process which can only be obtained when using a catalyst system capable of cracking the crude dioxane containing high boiling by-products of the dioxane synthesis step. Supported phosphoric acid catalysts generally cannot be used with crude dioxane feeds because of excessive coke formation and plugging of the catalyst bed.

EXAMPLE 6

In the preceding examples the cracking reaction was carried out in narrow (approx. 10–15 mm. diameter) tubes, and the endothermic heat of reaction was supplied in part by sensible heat of the steam diluent but in the main by indirect heat-transfer through the reactor wall. This example illustrates operation in a larger essentially adiabatic reactor (5 litres of carrier) in which the endothermic heat of reaction was supplied purely as sensible heat of the steam diluent, but mainly as sensible heat of a portion of the product stream which was passed through a heater external to the reactor where its temperature was raised to about 375° C. and returned to the reactor with the preheated fresh feed and steam diluent at this temperature. The arrangement of the catalyst system was otherwise the same as in Example 5, and a crude dioxane feed was used. Conditions were as follows, and the results are shown in Table 7.

Reaction Temperature: 325–375° C.
Reaction Period Between Regenerations: 12 hours
Catalyst Carrier: 5 litres silica gel (as in Example 2)
Boron Phosphate Charge: 1 litre
Fresh Dioxane Feed Rate: 3.3 litres/hour
Fresh Water Feed Rate: 1.3 litres/hour
Product Recirculation Rate: 5–10 volumes per volume total fresh feed (measured as gas)
Reaction Pressure: 2 lbs./sq. in. in gauge
4,4-Dimethyl-1,3-dioxane Content of Crude Feed, percent: 80–82%
Regeneration: with $O_2$ containing inert gas at temperatures below 450° C.

Table 7

| Run No. | Main products, wt. percent on Dioxane Consumed | | | Dioxane conversion, percent |
| --- | --- | --- | --- | --- |
| | Isoprene | Isobutene | Formaldehyde | |
| 1 | 40.6 | 22.3 | 38.8 | 87 |
| 2 | 39.2 | 22.4 | 34.8 | 83 |
| 3 | 37.1 | 20.4 | 33.3 | 78 |
| 4 | 37.9 | 21.9 | 35.4 | 89 |
| 5 | 34.6 | 24.4 | 32.9 | 88 |

At the end of a series of tests the performance of the catalyst was not significantly different from that at the start. During the series 114 lbs. of isoprene per lb. of silica gel charged and 1000 lbs. isoprene per pound boron phosphate transported were made. The temperature drop over the silica gel bed during reaction varied from about 25° C. to about 50° C., depending mainly on the rate of product recirculation. Coke deposited on the catalyst and burned off during regeneration amounted to approximately 1% of the crude dioxane feed during the series.

EXAMPLE 7

A boron phosphate/silica gel catalyst was made by mixing together a commercial crystalline boron phosphate powder, with commercial silica gel having the following characteristics: Mesh size 22–60 B.S.S., Surface area 300 m.$^2$/g., Pore volume 1.04 cc./g., Sodium 0.04%, Sulphate 0.02%. The boron phosphate powder used amounted to 10% w./w. of the silica gel.

The catalyst was used in a process in which a mixture of two liquid volumes of water with one liquid volume of 4,4-dimethyl-1,3-dioxane was passed in the vapour phase at 400° C. and atmospheric pressure, over the catalyst. The results are shown in Table 8, Run 1, for the first hours operation, and in Run 2 for the fourth hour.

*Table 8*

| Run No. | 1 | 2 |
|---|---|---|
| Percent boron phosphate in catalyst | 10 | 10 |
| Feed space velocity, moles total feed per litre of catalyst per hour | 244 | 238 |
| Duration of test, hours | 1 | 1 |
| Dioxane conversion, percent | 100 | 100 |
| Products formed, moles/100 moles dioxane converted: | | |
| Isoprene | 72 | 68 |
| Isobutene | 26 | 22 |
| Formaldehyde | 119 | 121 |

EXAMPLE 8

A boron phosphate/silica gel catalyst was made by mixing together equal volumes of boron phosphate particles (Mesh size 22–60 B.S.S.) prepared according to Houben-Weyl "Methoden der Organischen Chemie," 4th ed., E. Muller, 1955, vol. 4/2, page 217, with the commercial silica gel described in Example 7. The boron phosphate powder, before mixing with the silica gel, was dried for four hours at 110° C.

The catalyst was used in a process in which a mixture of two liquid volumes of water with one liquid volume of 4,4-dimethyl-1,3-dioxane was passed in the vapour phase, at 400° C. and atmospheric pressure, over the catalyst. The results are shown in Table 9.

EXAMPLE 9

A catalyst was made up as described in Example 8, except that the boron phosphate particles, before mixing with the silica gel, were heat treated at 990° C. for two hours.

The catalyst was placed in a reactor maintained at 400° C., and a mixture of two liquid volumes of water with one liquid volume of 4,4-dimethyl-1,3-dioxane was passed in the vapour phase at atmospheric pressure over the catalyst. The results are shown in Table 9. After 4 hours on stream this catalyst was still giving 100% conversion.

EXAMPLE 10

The process as described in Example 9 was repeated with a sample of a similar catalyst in which the boron phosphate had been treated with steam at 400° C. for 2 hours after heating. The results are shown in Table 9. After 4 hours on stream the catalyst was still giving 100% conversion.

*Table 9*

| Example | 8 | 9 | 10 |
|---|---|---|---|
| Vol. percent boron phosphate in catalyst. | 50 | 50 | 50 |
| Feed space velocity, moles total reactants/litre catalyst/hour. | 239 | 242 | 239 |
| Duration of test, hours | 1 | 1 | 1 |
| Dioxane conversion, percent | 100 | 100 | 100 |
| Products formed, moles/100 moles dioxane converted: | | | |
| Isoprene | 75 | 72 | 74 |
| Isobutene | 22 | 22 | 24 |
| Formaldehyde | 112 | 118 | 117 |

EXAMPLE 11

A commercial crystalline boron phosphate powder (100 parts by weight) was suspended by stirring in 500 parts by volume of 2.2 N-hydrochloric acid, and 2200 parts by volume of sodium silicate solution containing 100 parts by weight of silica were rapidly added with stirring. The gel set rapidly, and was washed first with 1% ammonium chloride solution and then with water. After drying, the gel was heat treated at 350° C.

A sample of this catalyst was placed in a reactor and heated to 350° C. A mixture of 4,4-dimethyl-m-dioxane vapour and steam having a dioxane partial pressure of 100 mm. was fed to the reactor at a rate of 250 moles of total feed/litre of catalyst/hour. The total pressure being atmospheric. After 4 hours the reactant stream was stopped and the catalyst was regenerated with a mixture of air and nitrogen at a temperature not exceeding 500° C. The reaction and regeneration cycles were then repeated. The results are shown in Table 10.

*Table 10*

| Run No. | Percent Dioxane Conversion | Percent Isoprene Efficiency | Isobutene Produced (g./100 g. isoprene) | Formaldehyde Produced (g./100 g. isoprene) |
|---|---|---|---|---|
| 1 | 100 | 63.2 | 34.9 | 75.7 |
| 2 | 100 |  | 32.7 |  |
| 3 | 100 | 64 | 31.0 | 78.0 |
| 4 | 99 | 63.8 | 32.3 | 78.3 |
| 5 | 93.5 | 65 | 26.9 | 79.5 |
| 6 | 97.0 | 69.2 | 23.2 | 74.5 |

These results showed an improvement in isoprene efficiency and a decline in isobutene production with age of the catalyst.

A further sample of the same catalyst was steamed for 16 hours at 350° C. at a rate of 4 litres of water/litre of catalyst/hr. in order to see if the steamed catalyst would give good isoprene efficiencies in the first reaction cycle. The steamed catalyst was then used in a series of reactions identical with those described above. The results are shown in Table 11.

*Table 11*

| Run No. | DMD Conversion, Percent | Isoprene Efficiency, Percent | Isobutene Produced (g./100 g. isoprene) | Formaldehyde Produced (g./100 g. isoprene) |
|---|---|---|---|---|
| 1 | 100 | 66.4 | 26.4 | 78.5 |
| 2 | 98.5 | 63.7 | 26.0 | 77.0 |
| 3 | 91.3 | 68.0 | 25.0 | 71.0 |
| 4 | 97.7 | 62.5 | 24.5 | 78.0 |
| 5 | 97.7 | 64.5 | 27.0 | 78.3 |
| 6 | 96.6 | 61.0 | 26.3 | 77.5 |

These results show that the first reaction period gave results very similar to those obtained in the fifth reaction in the previous series.

EXAMPLE 12

Boron phosphate particles, made as described in Example 8 were mixed with 22–60 Mesh B.S.S. Celite, a diatomaceous earth, in a proportion of 20% by volume. The catalyst was used in a process in which a mixture of two liquid volumes of water with one liquid volume of 4,4-dimethyl-1,3-dioxane was passed in the vapour phase at 400° C. and atmospheric pressure over the catalyst. The results are shown in Table 12.

*Table 12*

Run No. _____ 1
Volume percent boron phosphate in catalyst _____ 17
Feed space velocity, per litre Celite per hour _____ 238
Duration of test, hours _____ 1
Dioxane conversion, percent _____ 98
Products formed, moles/100 moles dioxane converted:
 Isoprene _____ 72
 Isobutene _____ 20
 Formaldehyde _____ 120

In comparison with the above examples two processes were carried out using boron phosphate alone, and silica gel alone as catalysts. The boron phosphate particles (mesh size 22–60 B.S.S.) prepared according to Houben-Weyl, "Methoden der Organischen Chemie," 4th ed., E. Muller, 1955, vol. 4/2, page 217 were heat treated at 900° C. for two hours. The silica gel was commercial silica gel described in Example 7.

In the two processes the catalyst was placed in a reactor maintained at 400° C., and a mixture of two liquid volumes of water with one liquid volume of 4,4-dimethyl-1,3-dioxane was passed in the vapour phase at atmospheric pressure over the catalyst. The results are shown in Table 13.

*Table 13*

| Run | 1 | 2 |
|---|---|---|
| Catalyst | (¹) | (²) |
| Feed space velocity, moles/litre/hour | 238 | 239 |
| Duration of process, hour | 1 | 1 |
| Dioxane conversion, percent | <30 | 100 |
| Products formed, moles/100 moles dioxane converted: | | |
| Isoprene | 33 | 20 |
| Isobutene | 13 | 57 |
| Formaldehyde | 110 | 170 |

¹ Boron phosphate alone.
² Silica gel alone.

We claim:
1. The process for the production of a conjugated diolefine which comprises contacting at a temperature in the range of 200 to 450° C. a 1,3-dioxane of the formula

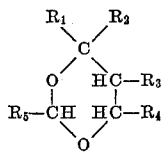

wherein $R_1$ is an alkyl radical, and $R_2$, $R_3$, $R_4$ and $R_5$ are selected from the group consisting of hydrogen, alkyl and aryl radicals, in the vapour phase in the presence of steam with a high-surface area inert carrier material on to which the components of boron phosphate are transported in an aqueous vapour stream from a bed of solid boron phosphate separate from the inert carrier material, by passing steam over solid boron phosphate.

2. The process as claimed in claim 1 wherein the carrier material is selected from the group consisting of silica gel and diatomaceous earths.

3. The process as claimed in claim 1 wherein the boron phosphate is subjected to a prior heat treatment at a temperature in the range 300° to 1000° C.

4. The process as claimed in claim 1 wherein the preheated gaseous reaction mixture containing steam is passed first over the boron phosphate and then over the carrier material.

5. The process as claimed in claim 1 wherein steam is passed over solid boron phosphate, and the resulting gaseous mixture containing the catalytic components is combined with a stream of 1,3-dioxane vapour and the mixed streams passed over the carrier material.

6. The process as claimed in claim 1 wherein the amount of boron phosphate transported is between 0.1 and 1.0 part by weight for every 1200 parts of dioxane fed.

7. The process as claimed in claim 1 wherein the amount of boron phosphate transported is between 0.25 and 0.5 part for every 1200 parts of dioxane fed.

8. The process as claimed in claim 1 wherein the 1,3-dioxane is 4,4-dimethyl-1,3-dioxane.

9. The process as claimed in claim 1 wherein the 1,3-dioxane is contacted with the carrier material at a temperature in the range 300° to 400° C.

10. The process as claimed in claim 1 wherein the space velocity of the 1,3-dioxane over the carrier material is between 0.1 and 100 liquid volumes of 1,3-dioxane per volume of carrier material per hour.

References Cited by the Examiner

UNITED STATES PATENTS

| 2,206,055 | 7/1940 | Shankland | 252—432 |
| 2,337,059 | 12/1943 | Mikeska et al. | 260—681 |
| 2,997,509 | 8/1961 | Wirth | 260—681 |

FOREIGN PATENTS

| 589,709 | 6/1947 | Great Britain. |
| 873,875 | 8/1961 | Great Britain. |
| 1,247,778 | 10/1960 | France. |

PAUL M. COUGHLAN, *Primary Examiner.*

ALPHONSO D. SULLIVAN, *Examiner.*